Dec. 28, 1954   J. R. SHERWOOD   2,698,409
DIFFERENTIAL SHAFT MECHANISM FOR
REMOTE POSITIONING SYSTEMS
Filed March 15, 1952   2 Sheets-Sheet 1

INVENTOR.
JOHN R. SHERWOOD
BY
ATTORNEY

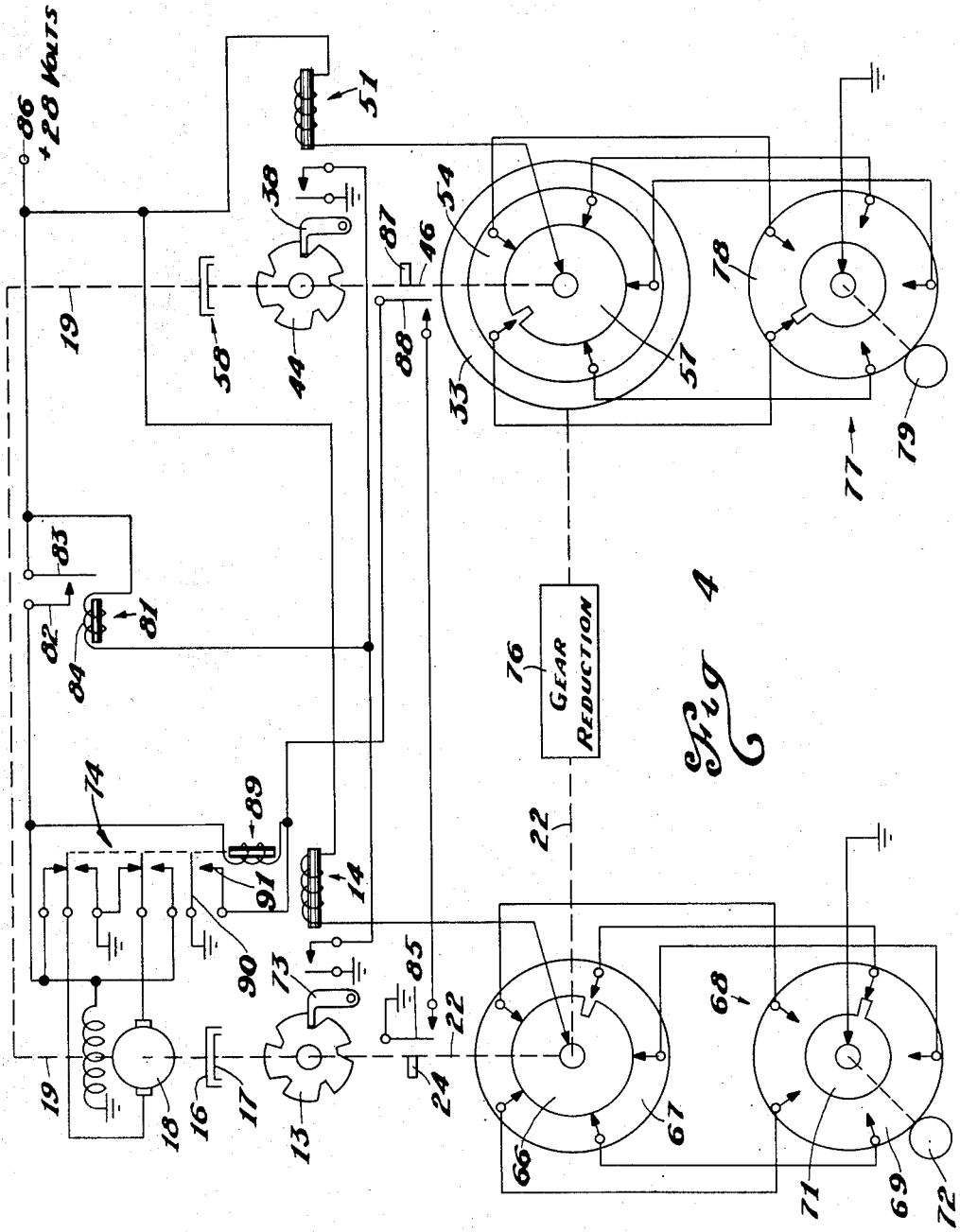

United States Patent Office 2,698,409
Patented Dec. 28, 1954

2,698,409
DIFFERENTIAL SHAFT MECHANISM FOR REMOTE POSITIONING SYSTEMS

John R. Sherwood, Cedar Rapids, Iowa, assignor to Collins Radio Company, Cedar Rapids, Iowa, a corporation of Iowa Application March 15, 1952, Serial No. 276,810

7 Claims. (Cl. 318—33)

This invention relates in general to shaft control mechanism and in particular to an apparatus which has a pair of shaft controlling devices whose outputs are added to get a composite shaft output.

Oftentimes it is desirable to add the positions of two controlled shafts so as to obtain a third shaft position which is proportional to the sum of the other two shafts. Mechanical differentials may be used for this purpose but they are relatively complicated. If great accuracy is maintained they are also expensive.

It is an object of this invention, therefore, to provide a differential shaft adding means which utilizes the principles set forth in Patent No. 2,476,673 by combining an apparatus according to this patent with a second shaft positioning mechanism.

Another object of this invention is to provide a differential which operates primarily on an electrical control system and which accurately and rapidly obtains an output shaft position proportional to the sum of input shaft positions.

Further objects, features and advantages of this invention will become apparent from the following description and claims when read in view of the drawings, in which:

Figure 4 is a possible circuit for controlling the differential apparatus of this invention.

One of the features of this invention is that it provides for remotely controlling a pair of shaft controlling mechanisms in such a fashion that the controlled shaft will be the sum of the remote shafts' positions. For example, suppose that it is desired to tune a radio transmitter from 100 to 200 megacycles in one megacycle step. Shaft positioning apparatus according to Patent No. 2,476,673 will easily attain 20 distinct positions. However, when the number is increased, a differential is required so that the outputs of a pair of shaft controlling mechanisms may be added together. This may be done by using a mechanical differential which adds the shaft outputs of the two systems on a suitable basis, as for example, 10 to 1.

This invention connects the output shaft of a first shaft controlling mechanism according to the above referenced patent to a reference plate of a second control apparatus which is made according to this invention. This gives a shaft output which is the sum of the two control apparatuses.

Figure 1:
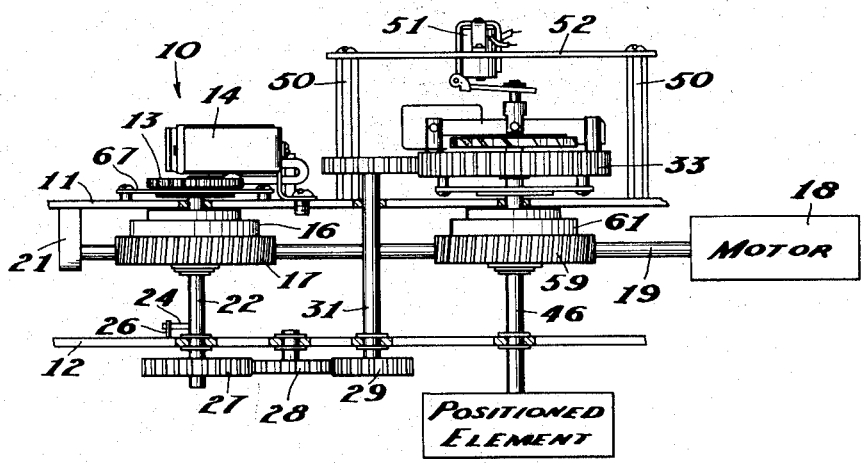
Figure 1 is a top view of the differential shaft controlling mechanism.

With reference to Figure 1, the first shaft controlling mechanism is designated generally as 10 and is mounted between end plates 11 and 12. It comprises a stop wheel 13, a pawl controlling relay 14, a clutch 16, and a driving gear 17 connected to the clutch.

A motor 18 drives a shaft 19 which is supported in a bracket 21 and which has a worm, not shown, that meshes with the driving gear 17. The stop wheel 13 is connected to a first controlled shaft 22 which is rotatably supported between plates 11 and 12. The driving gear 17 is connected to clutch 16 so as to drive shaft 22 when it is not held. A lever arm 24 extends from the shaft 22 and is engageable with a stop pin 26 mounted to the plate 12. The stop pin 26 limits the motion of the shaft 22 so that is cannot exceed 360 degrees.

A gear 27 is attached to the shaft 22 and meshes with a gear train comprising gears 28 and 29 to drive a shaft 31 rotatably supported between the plates 11 and 12. A gear 32 is attached to the other end of shaft 31 and meshes with a gear 33, which is shown in detail in Figure 3.

One side 34 of the gear 33 forms a reference plate for the second shaft control mechanism so that its zero position may be adjusted in order that the setting of the output shaft of the second apparatus will be the sum of the two shaft control mechanisms.

To accomplish this, a pair of projections 36 and 37 are attached to the face 34 of gear 33 and a pawl 38 is pivotally supported by projection 37 by a transverse pin 39 and a slot 41 is formed in the projection 36 to guide the pawl 38.

The pawl 38 has an engaging portion 42 adjacent the face 34. A spring 43 biases pawl 38 toward the face 34. A stop wheel 44 is mounted to a shaft 46 which is rotatably supported by the gear 33. The stop wheel 46 has a plurality of teeth 47 which have one straight side and a second tapered side for a purpose to be later described. A pawl lifting means 48 is attached to the pawl 38 by a pin 49 so that it may pivot slightly with respect to the pawl.

Figure 2:
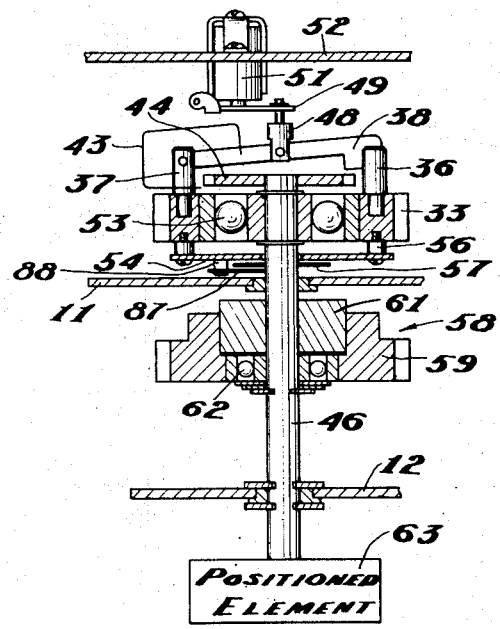
Figure 2 is a sectional view taken of the second shaft controlling mechanism of this invention.

As best shown in Figure 2, the pawl lifting means 48 is connected to an armature 49 of a relay 51. The relay 51 is mounted to a plate 52 which is connected to the plate 11 by stand-offs 50. It is to be noted that the pawl lifting means 48 may rotate with respect to the armature 49 and that when the armature 51 is energized it will lift the pawl 38 out of engagement with the stop wheel 44 for any angular position of the pawl.

The member 33 is mounted to shaft 46 by bearings 53. The stator 54 of a seeking switch is connected to the gear 33 by pins 56 and the rotor 57 of the seeding switch is connected to the shaft 46.

A second clutch, designated generally as 58, has a geared driving portion 59 and a driven portion 61. The driven portion 61 is attached to the shaft 46 whereas the driving portion 59 is rotatably supported with respect to the shaft 46 by bearings 62. The driving portion makes frictional engagement with the driven portion so as to rotate it when the pawl 38 is not locked with the stop wheel 44.

A controlled element 63 is attached to the free end of the shaft 46 and it is this element which is to be controlled by the apparatus. As shown in Figure 1, the motor 18 drives the gear 59 through the shaft 19 which has a worm that meshes therewith. This worm is not shown because it is behind the gear as shown in Figure 1.

Figure 3:
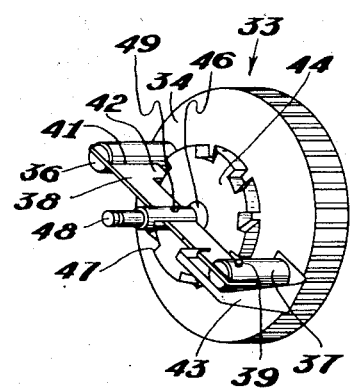
Figure 3 is a perspective view of the stop wheel and locking pawl of the apparatus shown in Figure 2.

Figure 4 illustrates a wiring diagram for controlling the apparatus shown in Figures 1, 2, and 3. The shaft 22 of the first shaft controlling mechanism 10 is attached to the rotor 66 of a first controlled switch. The stator 67 has a plurality of contacts mounted thereon which are connected, respectively, to the stator 69 of a remote control switch designated generally as 68. It has a rotor 71 attached to a control knob 72 for varying its angular position.

A number of types of control switches may be used for shaft control apparatus according to this invention and for a more detailed description reference may be made to Patent No. 2,476,673.

The stop wheel 13 is engaged by the pivoted pawl 73 which may be controlled by relay 14.

The motor 18 has its output terminals connected to a reversing switch designated generally as 74 which changes the polarity of the voltage supplied to the motor 18 when it is actuated.

A gear reduction 76 receives the shaft 22 and supplies an output to the member 33. The gear reduction might have a 10 to 1 reduction. The rotor 57 and stator 54 mounted to and adjacent respectively, the gear 33 form a second seeking switch for the second shaft controlling mechanism of this invention.

A second control switch is designated generally as 77 and has its stator 78 connected to the stator 54 and its rotor connected to a control knob 79.

The stop wheel 44 is engaged by the locking pawl 38 which is shown schematically as a pivoted pawl. It is to be realized that it in fact is the shape shown in Figure 2.

The pawl 38 is controlled by the armature of the relay 51.

A motor run switch 81 comprises a pair of switching contacts 82 and 83 respectively. A terminal 86 is connected to a suitable voltage source, as for example, 28 volts D. C. and is connected respectively to the relay 14, 51, and 81. It is also connected to the motor 18 through a polarity reversing switch 74.

For illustrative purposes, let it be assumed that both of the knobs 74 and 79 have been moved to a new position such that a closed circuit exists through both switches 68 and 77.

This will close relays 14 and 51 as well as relay 81. When the relay 81 closes the motor 18 will run in such a manner that it will return the stop wheels 13 and 44 respectively, to a home position. When they reach the home position the stop 24 connected to shaft 22 will engage a switch 85 to close it and a stop 87 mounted on shaft 46 will engage a switch 88 to close it.

When both of these switches are closed, a circuit from the terminal 86 is connected through the energizing coil of the reversing relay 89 so that it moves the switch contacts of the reversing circuit 74 and reverses the polarity of the voltage supplied to the motor. A grounded contact 90 engages a lead 91 which is connected to relay 89 when the relay is energized. The motor 18 then runs in the opposite direction and drives the rotors 66 and 44 until open circuits are formed in both switches. When this occurs the relays 14, 51, and 81 release thus locking the two stop wheels in their new position.

It is to be realized, of course, that the stop wheels 13 and 44 may not reach their new positions at identical times and when this occurs the respective control relay will drop out with the pawl holding the stop wheel until the other stop wheel is set up. During this interval the clutch between the motor and the locked stop wheel will slip.

When both switches have discovered an open position the relay 81 will open. The grounded contact 90 keeps the relay 89 energized until switch 83 opens and thus it is ready to start a new cycle.

It is to be realized, of course, that the switches 86 and 88 are closed only during the interval when the motor reverses and this is the reason for the locking pawl 91. It will hold the reversing switch 74 until the new shaft position is obtained.

It is seen that this invention discloses a differential shaft control mechanism that allows the setting of a first shaft positioning apparatus to adjust the reference plate of a second shaft positioning apparatus until the correct output shaft position is obtained.

It is to be realized that more than two shaft positioning devices may be connected in series and that two devices are shown for illustrative purposes only.

Although this invention has been described with respect to a particular embodiment thereof, it is not to be so limited as changes and modifications may be made therein which are within the full intended scope of the invention, as defined by the appended claims.

I claim:

1. A differential shaft positioning apparatus comprising, a first shaft positioning mechanism adapted to position a first shaft to one of a plurality of positions, said first shaft rotatably supported between a pair of end plates, a second shaft positioning mechanism, said first shaft geared to the second shaft controlling mechanism to vary its reference position, and said second shaft positioning mechanism adapted to control its output shaft to a plurality of positions.

2. An apparatus according to claim 1 wherein said second shaft positioning mechanism comprises a shaft rotatably supported by said end plates, a stop wheel attached to said shaft, a gear rotatably supported by said shaft, a locking pawl mounted on said gear and engageable with said stop wheel, electromagnetic means engageable with said pawl to control its position relative to said stop wheel, a driving means connected to said shaft, and a motor controlled circuit connected to said driving means and said electromagnetic means for controlling the position of said shaft.

3. A differential shaft controlling mechanism comprising, an output shaft, a first shaft controlling mechanism connected to said output shaft, a toothed stop wheel connected to said output shaft, a gear rotatably supported by said output shaft adjacent said stop wheel, a pawl pivotally supported by said gear and engageable with said stop wheel, a second shaft controlling mechanism furnishing a shaft output to drive said gear, and the position of the output shaft equal to the position of the stop wheel relative to the gear plus the position of the shaft output of the second shaft controlling mechanism.

4. A differential shaft controlling mechanism comprising, a first shaft controlling mechanism, a second shaft controlling mechanism, the output of the first shaft controlling mechanism geared to the second shaft controlling mechanism, a stop wheel mounted on the output shaft of the second shaft controlling mechanism, a pawl pivotally supported by said second shaft controlling mechanism and engageable with said stop wheel, a pawl controlling relay connected to the pawl to control its position, a gear reduction mounted between the first and second shaft controlling mechanisms, a driving means geared to the first and second shaft controlling mechanisms, a seeking switch connected to each of said shaft controlling mechanisms, a control switch connected to each of said seeking switches, and said driving means connected electrically to each of said seeking switches.

5. Means for differentially adding a pair of shaft positions comprising, a first shaft controlling mechanism, a second shaft controlling mechanism, the output shaft of said first shaft controlling mechanism connected to drive a reference plate of said second shaft controlled mechanism, a driving means connected to drive said first and second shaft controlling mechanisms, a seeking switch for each of said shaft controlling mechanisms, a control switch for each of said shaft positioning mechanisms, a pair of pawl controlling relays connected, respectively, to said seeking switches, a voltage source, a driving means reversing switch connected to said driving means, and a motor-run switch connected in series between said motor reversing switch and said voltage source.

6. Differential shaft controlling mechanism comprising, a first shaft controlling mechanism producing a first shaft output, a second shaft controlling mechanism producing a second shaft output, a gear reduction connected to the first shaft, the output of the gear reduction connected to the reference plate of said second shaft controlling mechanism to vary it in response to the position of the first shaft, driving means connected to the first and second shaft controlling mechanisms, and electrical control circuits connected to the first and second shaft controlling mechanisms and the driving means.

7. Means for positioning an output shaft to a plurality of positions, comprising, a first shaft controlling mechanism, a second shaft controlling mechanism, said first shaft controlling mechanism geared to the second shaft positioning mechanism to position it, a driving means connected to said first and second shaft controlling mechanisms, a first electric control circuit of said first shaft controlling mechanism connected to said driving means, a second electric control circuit of the second shaft controlling mechanism connected to said driving means, said first and second electric control circuits comprising, a pair of seeking switches, a pair of control switches electrically connected to said seeking switches, a first pawl controlling relay mounted on said first shaft controlling mechanism, a second pawl controlling relay mounted on the second shaft controlling mechanism, said first seeking switch electrically connected to said first pawl controlling relay, said second seeking switch electrically connected to said second pawl controlling relay, the opposite sides of first and second pawl controlling relays connected together and to one side of a voltage source, a reversing switch connected in the electrical circuit of said driving means, and a motor-run switch connected to said voltage source and to said motor reversing switch.

References Cited in the file of this patent

UNITED STATES PATENTS

| Number | Name | Date |
|---|---|---|
| 2,442,739 | Yardeny | June 1, 1948 |
| 2,467,422 | Bruene | Apr. 19, 1949 |
| 2,493,844 | Yardeny | Jan. 10, 1950 |
| 2,517,155 | Yardeny | Aug. 1, 1950 |